US011560959B1

(12) United States Patent
Barni et al.

(10) Patent No.: US 11,560,959 B1
(45) Date of Patent: Jan. 24, 2023

(54) TRUNNION BALL VALVE WITH CONTROLLED BALL-SEAT ENGAGEMENT AND DISENGAGEMENT

(71) Applicant: Flowserve Management Company, Irving, TX (US)

(72) Inventors: Danilo Barni, Milan (IT); Luca Simontacchi, Milan (IT)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 17/505,849

(22) Filed: Oct. 20, 2021

(51) Int. Cl.
*F16K 11/087* (2006.01)
*F16K 5/20* (2006.01)
*F16K 27/06* (2006.01)

(52) U.S. Cl.
CPC ............ *F16K 11/087* (2013.01); *F16K 5/201* (2013.01); *F16K 27/067* (2013.01)

(58) Field of Classification Search
CPC ...... F16K 11/087; F16K 5/021; F16K 27/067; F16K 5/205; F16K 5/208; F16K 5/207; F16K 5/168; F16K 5/188
USPC ......................................... 251/172, 159, 160
See application file for complete search history.

(56) References Cited

U.S. PATENT DOCUMENTS

| | | | | |
|---|---|---|---|---|
| 3,617,025 A | * | 11/1971 | Gerbic | F16K 5/205 251/315.08 |
| 3,669,404 A | * | 6/1972 | Kaiser | F16K 5/205 251/315.08 |
| 3,776,506 A | * | 12/1973 | Fowler | F16K 5/205 251/315.01 |

* cited by examiner

*Primary Examiner* — Michael R Reid
(74) *Attorney, Agent, or Firm* — Maine Cernota & Rardin

(57) ABSTRACT

A trunnion ball valve provides a reliable seal when closed, while minimizing or eliminating frictional resistance during rotation of the ball. A pressurization chamber behind the upstream valve seat can be interconnected by one or more pressurization valves with either the upstream or the downstream process fluid. The interconnection can be via a single 3-way valve. When the valve is closed and the ball is fixed in orientation, the pressurization chamber is automatically connected to the upstream process fluid, thereby pressing the seat against the ball and ensuring a reliable seal. While the ball is being rotated, the pressurization chamber is automatically connected to the downstream process fluid, thereby substantially eliminating valve seat friction. Connection to the downstream process fluid can include connection to a small space in front of the upstream seat. An electronic controller can control both valve stem rotation and the pressurization valves.

10 Claims, 5 Drawing Sheets

TRUNNION BALL VALVE WITH CONTROLLED BALL-SEAT ENGAGEMENT AND DISENGAGEMENT

FIELD OF THE INVENTION

The invention relates to valves, and more particularly, to trunnion ball valves.

BACKGROUND OF THE INVENTION

A floating ball valve includes a ball that that is fixed to a valve stem at the top of the ball, but otherwise "floats" within a body cavity of a valve housing, such that when the valve is shut, the ball is pushed by the in-line pressure of the process fluid against a downstream seat provided within an outlet of the floating ball valve, thereby providing in a tight seal. When the valve is opened, the ball must be rotated against both the in-line pressure of the process fluid and the friction between the ball and the downstream valve seat.

With reference to FIG. 1A, in a trunnion ball valve, the bottom of the ball 100 is inserted in a central bottom shaft (the trunnion 101). The ball 100 is thereby fixed between the valve stem or an upper trunnion (not shown) at the top of the ball 100 and the lower trunnion 101 at the bottom of the ball 100, so that the ball 100 is able to rotate about an axis 106, but is otherwise fixed in position relative to the ball supports 104, and thereby to the housing or "body" of the valve. Instead of pressing a floating ball against a fixed downstream seat 109, in a trunnion ball valve at least one of the seats 108, 109 is movable, suspended for example by springs, which allows the inline pressure of the process fluid 110 to press the upstream seat 108 that is within the inlet of the trunnion ball valve against the ball 100, thereby providing a reliable seal when the valve is closed, i.e. when the central passage 102 through the ball 100 is directed away from the seats 108, 109.

As a result, when opening and closing the valve, the ball only needs to be rotated against the friction of the upstream seat 108, whereby the required torque of a trunnion mounted ball valve is generally lower than for a comparable floating ball valve. Also, the trunnion seat design in general is much more stable, which makes it more suitable for extreme conditions.

With reference to the close-up view of FIG. 1B, which also includes a section of the conduit 116 through which the process fluid 110 is conveyed, it can be seen that in a typical trunnion valve the rear surface 112 of the upstream seat 108 is subjected to the upstream pressure of the process fluid, while the front surface 113 of the upstream seat 108 is directed toward a small space 114 within the body cavity that is at a fluid pressure similar to the much lower fluid pressure downstream of the valve.

While the frictional resistance of a trunnion ball valve is typically less than for a floating ball valve, nevertheless it can be significant, due to the pressing of the upstream seat 108 against the ball 100. This friction increases the required torque when opening the valve, and is a primary source of valve wear and sticking. As a result, it is typically necessary to reach a design compromise between applying a higher force to the upstream seat 108, which will improve the quality of the seal, and applying a lower force to the upstream seat 108, which will reduce the required torque and the resulting valve wear.

One approach is to inject a pressurized pneumatic fluid into the small space 114 at the front of the upstream seat 108 when the ball 100 is being rotated, and to withdraw or depressurize the pneumatic fluid from the small space 114 once ball rotation has been completed. However, this approach adds significant complexity and cost due to the requirement of providing a separate pneumatic fluid source that is able to control the pneumatic pressure that is applied to the small space 114.

What is needed, therefore, is a trunnion ball valve that provides a high-quality seal when the ball is fixed in orientation and the valve is closed, while minimizing valve seat friction while the ball is being rotated.

SUMMARY OF THE INVENTION

The present invention is a trunnion ball valve that provides a high-quality seal when the ball is fixed in orientation and the valve is closed, while minimizing valve seat friction while the ball is being rotated. This is accomplished by actively controlling the pressure of the upstream seat against the ball, such that the pressure is high when the ball is fixed in orientation and the valve is partially or fully closed, while the pressure of the upstream seat against the ball is greatly reduced or eliminated while the ball is being rotated.

Rather than implementing a complex and expensive external pressurized pneumatic fluid system, the present invention uses the process fluid itself as the control fluid for adjusting the pressure of the upstream seat against the ball. This is accomplished by substantially isolating the rear of the upstream seat from the process fluid, and instead providing a separate pressurization chamber behind the upstream seat, where the pressurization chamber can be connected by one or more pressurization valves to either the downstream process fluid or to the fluid within the body cavity or downstream of the valve.

Changing the state of the valve seat pressure requires only control of the one or more pressurization valves, which in embodiments is a single three-way valve (or equivalent device) that is in communication with the upstream process fluid and with the small space within the body cavity, or with some other region of the body cavity or the downstream process fluid. When the trunnion ball valve is closed and the rotational orientation of the ball is fixed, the pressurizing valves are set to a pressurizing configuration that connects the pressurization chamber with the upstream process fluid, thereby driving the upstream seat forward against the ball. When the ball is to be rotated, the pressurization valves are reconfigured to a pressure relief configuration that connects the pressurization chamber with the small space in front of the upstream seat, or with some other region of the body cavity or the downstream process fluid, thereby substantially equalizing the pressures within the pressurization chamber at the rear of the upstream seat and the small space at the front of the upstream seat.

In embodiments, the upstream valve seat presents a larger surface to the small space in front of the valve seat as compared to the pressurization chamber at the rear of the valve seat. As a result, equalization of the pressures within these two spaces results in a net pressing of the upstream valve seat away from the ball.

In some embodiments, the pressurization valves are mechanically linked to a manually actuated mechanism that drives the valve stem, such that the pressurization valves are transitioned to the pressure relief configuration before and during rotation of the valve stem, and are re-transitioned to their pressurizing configuration when the valve is fully closed and rotation of the valve stem has ceased.

In other embodiments, the pressurization valves are mechanically, electrically, pneumatically, or hydraulically driven, and an electronic controller is implemented that controls both the valve stem rotation and the configuration of the pressurization valves.

It should be noted that, unless otherwise required by context, the terms "pressurization valves" and "3-way valve" are used herein interchangeably to denote any single valve, any plurality of valves, or any other mechanism, that can be transitioned between at least two states so as to connect one or the other of two inlets to a common outlet.

The present invention is a trunnion ball valve that includes a valve housing having a top, a bottom, a valve inlet, and a valve outlet, a valve stem extending through the top of the valve housing, a ball within a body cavity of the valve housing that is fixed on an upper end thereof to the valve stem and is translationally fixed at a lower end thereof to the bottom of the housing via a lower trunnion, such that the ball is able to rotate with the valve stem but is otherwise fixed in location, the ball being penetrated by at least one central passage, an upstream valve seat that is laterally displaceable within the valve housing inlet so as to be pressed against the ball or displaced away from the ball, a pressurization chamber that abuts an upstream facing surface of the upstream valve seat, and at least one pressurization valve.

The at least one pressurization valve can be transitioned between a pressurizing state and a depressurizing state, the at least one pressurization valve being configured to place the pressurization chamber in fluid communication with process fluid upstream of the valve inlet when the pressurization valves are in the pressurizing state, and to place the pressurization chamber in fluid communication with process fluid downstream of the valve inlet when the valves are in the depressurizing state, the pressurization chamber being otherwise isolated from the process fluid both upstream and downstream of the trunnion ball valve.

In embodiments, the at least one pressurization valve is a single valve. In some of these embodiments, the single valve is a 3-way valve.

In any of the above embodiments, when the pressurization valves are in the depressurizing state, the pressurization chamber can be in fluid communication with a small space that abuts a downstream-facing surface of the upstream valve seat, the small space being in fluid communication with the process fluid downstream of the valve outlet. In some of these embodiments the upstream facing surface of the upstream valve seat is smaller in area than the downstream-facing surface of the upstream valve seat, such that when the pressurization valves are in the depressurizing state, there is a net pressing of the upstream valve seat away from the ball.

In any of the above embodiments, the pressurization valves can be configured to be automatically transitioned to the depressurized state while the ball is being rotated, and to the pressurizing state when the trunnion ball valve is closed and the ball is fixed in orientation. In some of these embodiments the pressurization valves are configured to be automatically transitioned to the depressurizing state before the ball is rotated, and to the pressurizing state after the trunnion ball valve is closed and the ball is fixed in orientation.

In some of these embodiments the pressurization valves are mechanically linked, either directly or indirectly, to the valve stem, so that rotation of the valve stem while closing the trunnion ball valve mechanically causes the valves to transition to the depressurizing state, while other of these embodiments further include an electronic valve controller that is configured to place the pressurization valves in the depressurizing state when the ball and the valve stem are being rotated, and to place the pressurizing valves in the pressurizing state when the trunnion ball valve is closed and the ball is fixed in orientation. And in some of these embodiments the electronic controller is configured to control rotation of the valve stem as well as reconfiguration of the pressurization valves.

In any of the above embodiments, the ball can be fixed in lateral position at an upper end thereof to the top of the housing via an upper trunnion.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
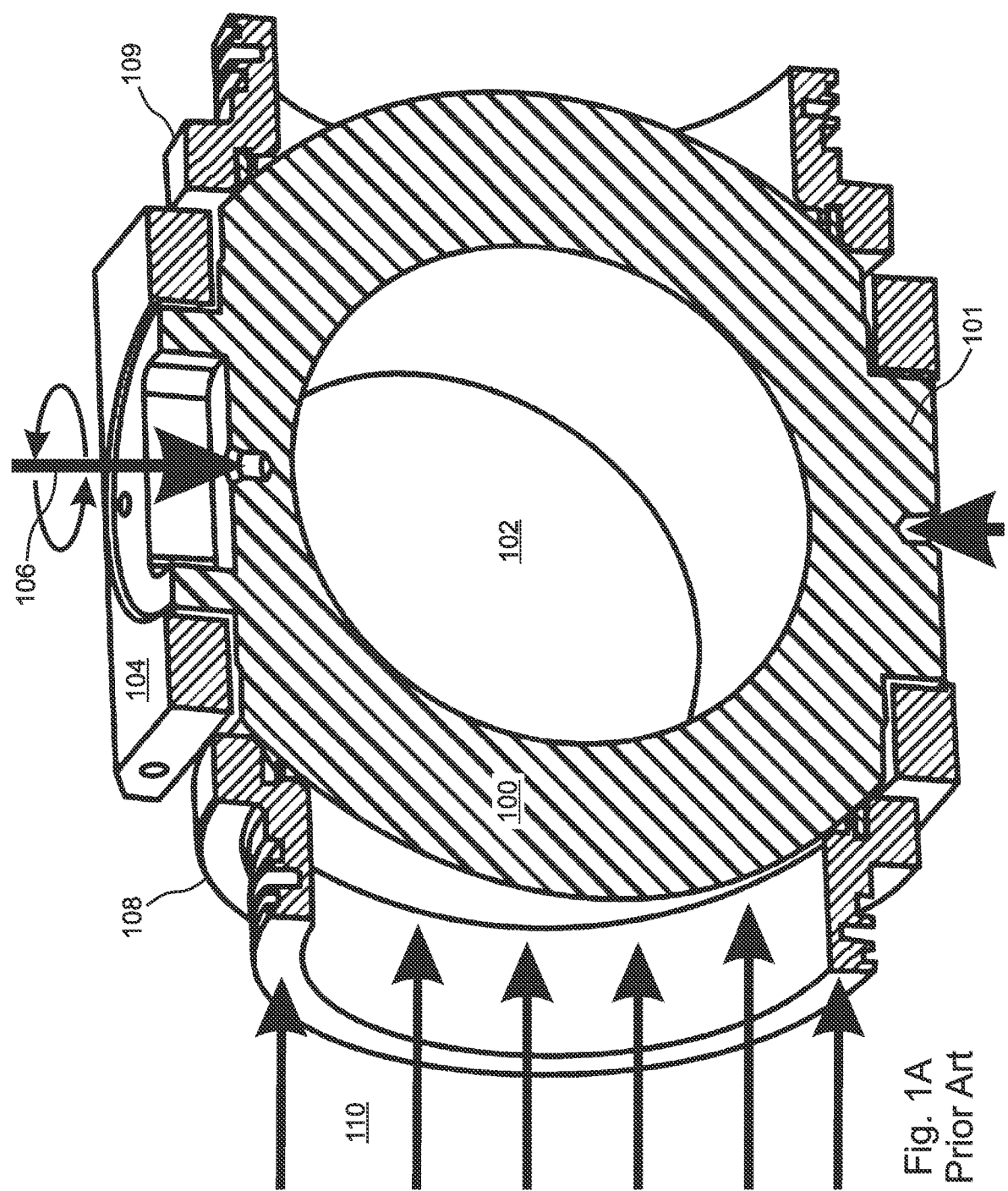
FIG. 1A is a sectional view of a trunnion ball valve of the prior art.
Figure 1B:
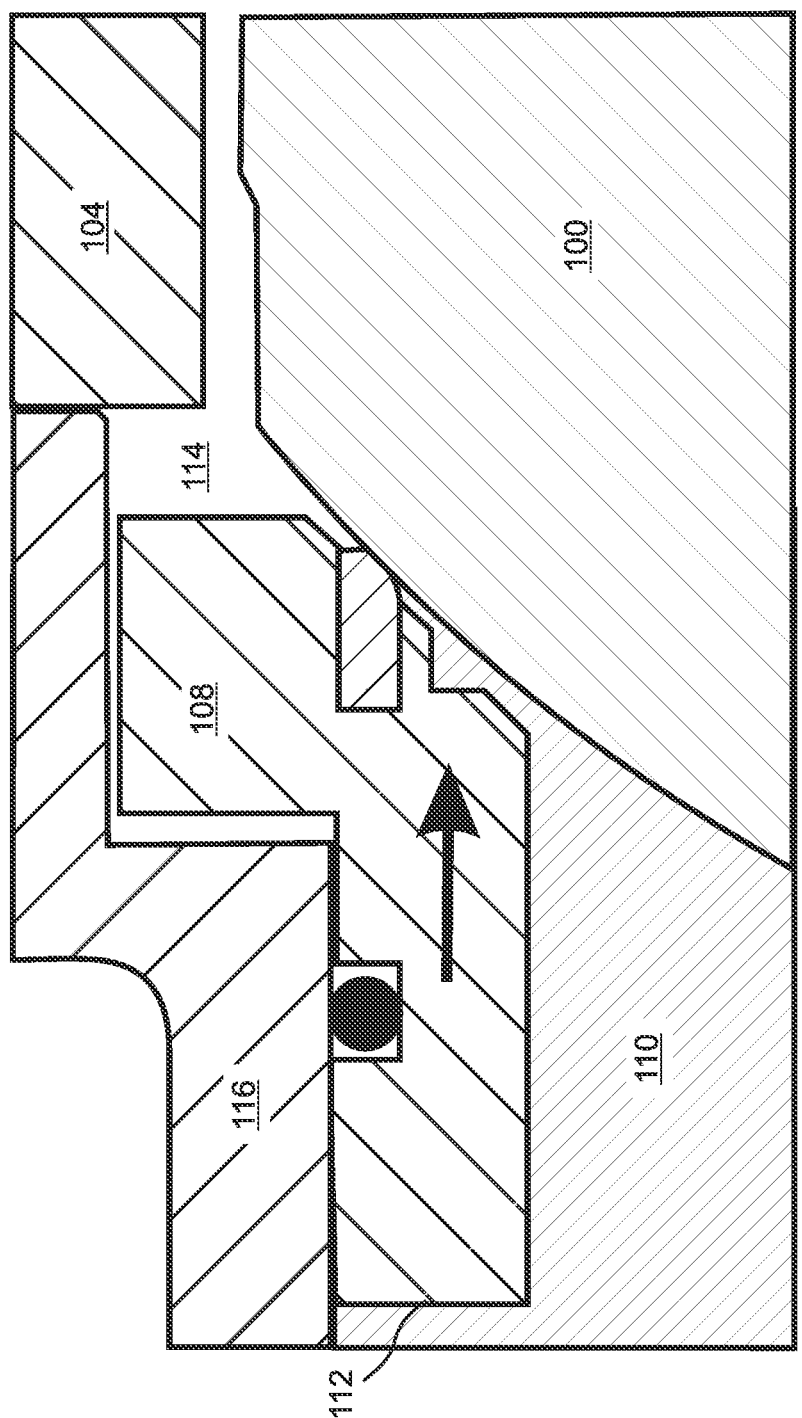
FIG. 1B is a close-up sectional view of the trunnion ball valve of FIG. 1A.
Figure 2A:
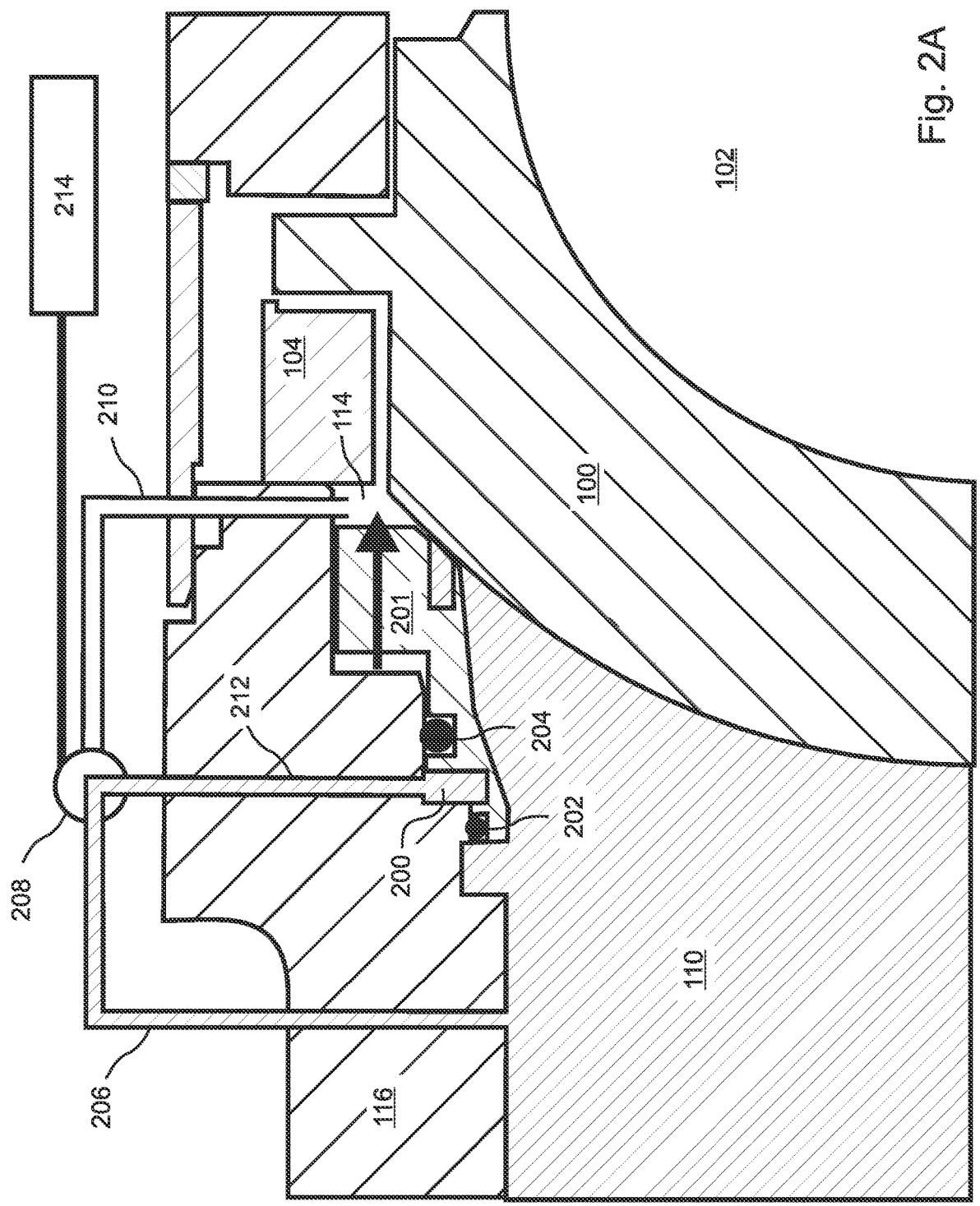
FIG. 2A is a sectional view of a trunnion ball valve in an embodiment of the present invention, shown as configured when the valve is closed and the orientation of the ball is fixed.
Figure 2B:
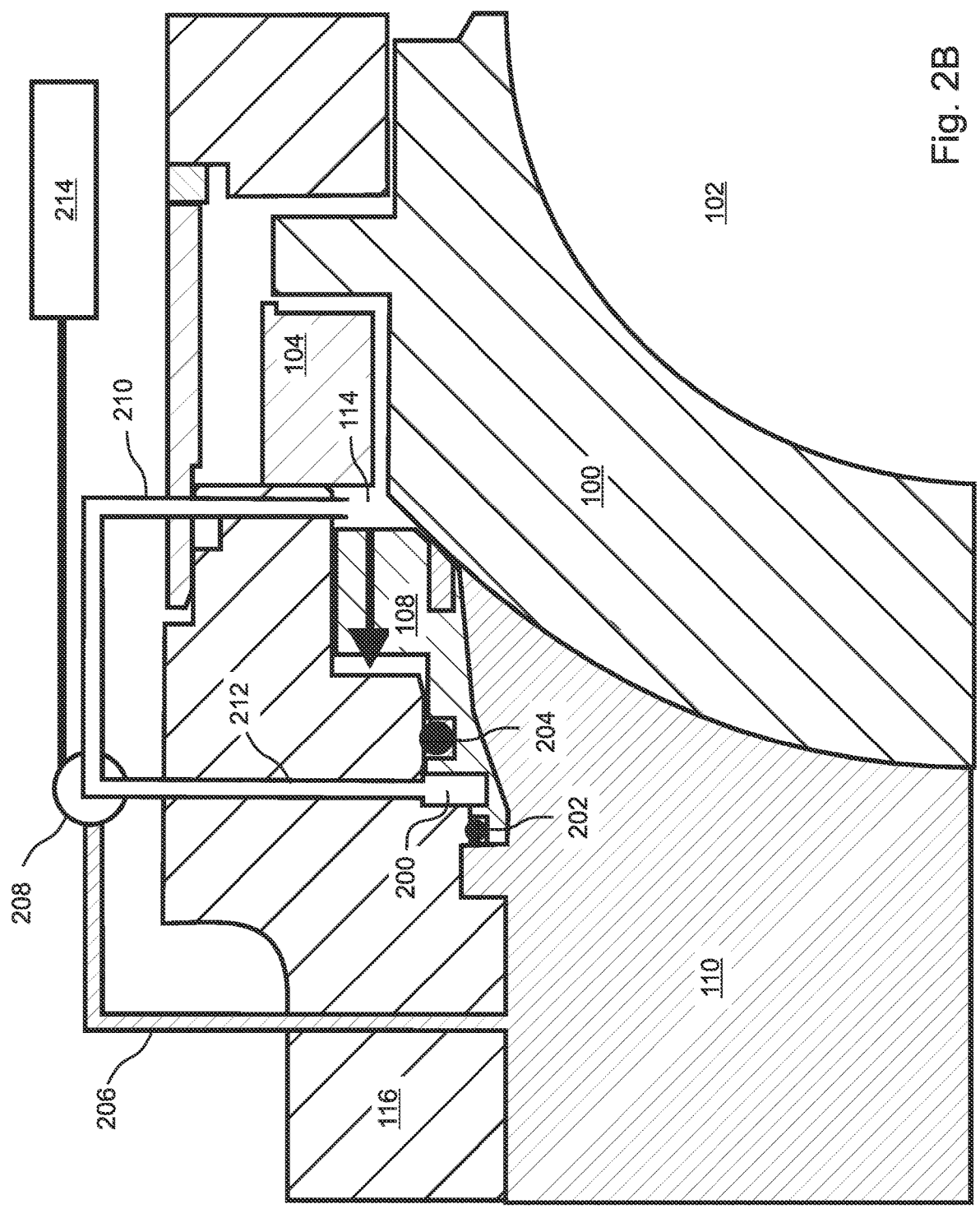
FIG. 2B is a sectional view of the trunnion ball valve of FIG. 2A, shown as configured when the ball is about to be rotated.

The present invention is a trunnion ball valve that provides a high-quality seal when the ball is fixed in orientation and the valve is closed, while minimizing valve seat friction while the ball is being rotated. With reference to FIGS. 2A and 2B, this is accomplished by actively controlling the pressure of the upstream seat 201 against the ball 100, such that the pressure is high when the ball 100 is fixed in orientation and the valve is partially or fully closed, while the pressure of the upstream seat 201 against the ball 100 is greatly reduced or eliminated when the ball 100 is being rotated.

Rather than implementing a complex and expensive external pressurized pneumatic fluid system, the present invention uses the process fluid itself as the control fluid for adjusting the pressure of the upstream seat 201 against the ball 100. This is accomplished by reducing or eliminating the exposure of the rear of the upstream seat 201 to the upstream process fluid 110, and instead providing a separate pressurization chamber 200 behind the upstream seat 201, where the pressurization chamber 200 is can be interconnected by one or more valves 208 either to the upstream process fluid 100 or to the body cavity, including the small downstream space 114 that is in front of the upstream seat 201. In the illustrated example, the interconnection of the pressurization chamber 200 to the upstream process fluid 110 or to the small space 114 is controlled by a single 3-way valve, and the pressurization chamber 200 is otherwise isolated from the upstream process fluid 110 and from the small space 114 the by a pair of O-rings 202, 204.

According to the present invention, the upstream process fluid 110 is connected via an upstream fluid bypass 206 to one or more pressurization valves, which are represented in FIGS. 2A and 2B by a single three-way valve 208, which is also connected to a pressurization passage 212 that is in fluid communication with the pressurization chamber 200. When the trunnion ball valve is closed, as illustrated in FIG. 2A, the upstream fluid bypass 206 is connected by the three-way valve to the pressurization passage 212, so that the fluid pressure within the pressurization chamber 200 is substantially equal to the upstream process fluid pressure.

Figure 3:
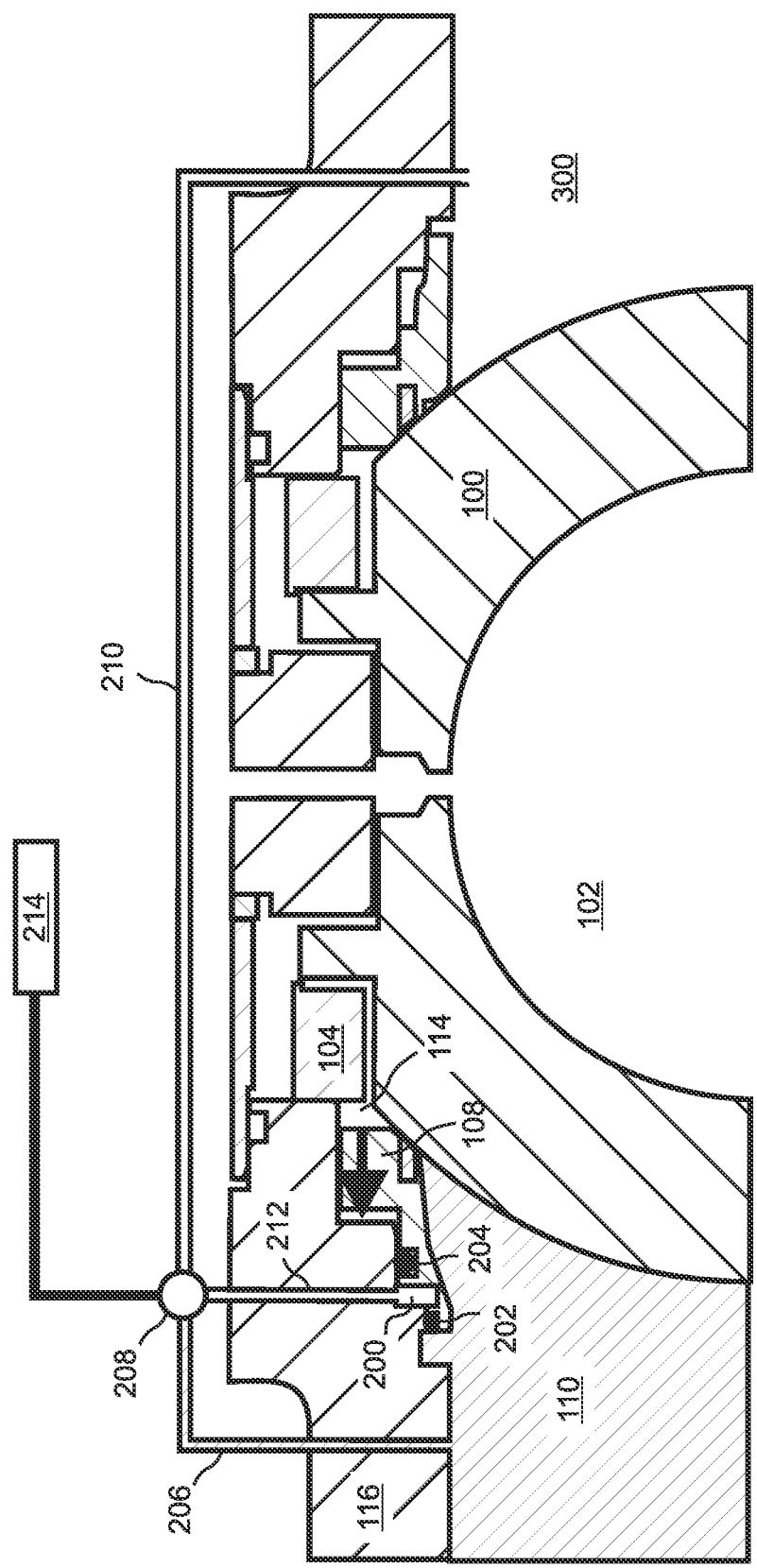
FIG. 3 is a sectional view of a trunnion ball valve similar to the valve of FIGS. 2A and 2B, but in which the downstream fluid bypass interconnects the small space with a fluid flow region that is downstream of the valve.

The three-way valve 208 is also connected via a downstream fluid bypass 210 to a region that is at a lower pressure than the upstream fluid, such as to the small space 114 that is in front of the upstream valve seat 201, as shown in FIGS. 2A and 2B, and/or to another lower pressure location within the body cavity and/or to the process fluid channel 300 downstream of the valve, as is shown in FIG. 3. When the valve is closed, as shown in FIG. 2A, the three-way valve 208 isolates and shuts off the downstream fluid bypass 210. When rotation of the ball 100 is required, as is shown in FIG. 2B, the three-way valve is reconfigured to shut off and isolate the upstream fluid bypass 206 while connecting the downstream fluid bypass 210 with the pressurizing passage 212, thereby substantially equalizing the pressure within the pressurization chamber 200 with the downstream process fluid pressure, and reducing or eliminating the pressing force that is applied to the upstream seat 201.

In the embodiment of FIGS. 2A and 2B, changing the state of the upstream valve seat pressure thereby requires only control of a single three-way valve 202 that is in fluid communication with the upstream process fluid 110 and with the small space 114 within the body cavity, or with some other region of the body cavity or the downstream process fluid.

In the illustrated embodiment, the upstream valve seat 201 presents a larger surface to the small space 114 in front of the valve seat 201 as compared to the pressurization chamber 200 at the rear of the valve seat 201. As a result, equalization of the pressures within these two spaces results in a net pressing of the upstream valve seat 201 away from the ball 100.

In some embodiments, the three-way valve is mechanically linked to a manually actuated mechanism 214 that drives the valve stem, such that the three-way valve is automatically transitioned to its pressure relief configuration before rotation of the valve stems commences, and is re-transitioned to its pressurizing configuration when the valve is fully closed and rotation of the valve stem has ceased.

In other embodiments, the three-way valve 208 is mechanically, electrically, pneumatically, or hydraulically driven, and an electronic controller 214 controls both the valve stem rotation and the configuration of the three-way valve. Note that element 214 in FIGS. 2A and 2B can represent either a purely mechanical linkage or an electronic controller.

FIG. 3 is a sectional view of a trunnion ball valve that is similar to the valve of FIGS. 2A and 2B, but in which the downstream fluid bypass 210 interconnects the 3-way valve 208 with a fluid flow region 300 that is downstream of the trunnion valve.

It should be noted that, unless otherwise required by context, the term "three-way valve" is used herein to denote any single valve, any plurality of valves, or any other mechanism, that can be transitioned between at least two states so as to connect one or the other of two inlets to a common outlet.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A trunnion ball valve, comprising:
   a valve housing having a top, a bottom, a valve inlet, and a valve outlet;
   a valve stem extending through the top of the valve housing;
   a ball within a body cavity of the valve housing that is fixed on an upper end thereof to the valve stem and is translationally fixed at a lower end thereof to the bottom of the housing via a lower trunnion, such that the ball is able to rotate with the valve stem but is otherwise fixed in location, the ball being penetrated by at least one central passage;
   an upstream valve seat that is laterally displaceable within the valve housing inlet so as to be pressed against the ball or displaced away from the ball;
   a pressurization chamber that abuts an upstream facing surface of the upstream valve seat;
   a small space that abuts a downstream-facing surface of the upstream valve seat, the small space being in fluid communication with process fluid downstream of the valve outlet;
   at least one pressurization valve, wherein the at least one pressurization valve can be transitioned between a pressurizing state and a depressurizing state, the at least one pressurization valve being configured to place the pressurization chamber in fluid communication with process fluid upstream of the valve inlet when the at least one pressurization valve is/are in the pressurizing state, and to place the pressurization chamber in fluid communication with process fluid downstream of the valve inlet, thereby substantially equalizing pressures at the upstream facing and downstream facing surfaces of the upstream valve seat, when the at least one pressurization valve is/are in the depressurizing state, the pressurization chamber being otherwise isolated from the process fluid both upstream and downstream of the trunnion ball valve.

2. The trunnion ball valve of claim 1, wherein the at least one pressurization valve is a single valve.

3. The trunnion ball valve of claim 2, wherein the single valve is a 3-way valve.

4. The trunnion ball valve of claim 1, wherein when the at least one pressurization valve is/are in the depressurizing state, the pressurization chamber is in fluid communication with the small space that abuts the downstream-facing surface of the upstream valve seat.

5. The trunnion ball valve of claim 4, wherein the upstream facing surface of the upstream valve seat is smaller in area than the downstream-facing surface of the upstream valve seat, such that when the at least one pressurization valve is/are in the depressurizing state, there is a net pressing of the upstream valve seat away from the ball.

6. The trunnion ball valve of claim 1, wherein the at least one pressurization valve is/are configured to be automatically transitioned to the depressurized state while the ball is being rotated, and to the pressurizing state when the trunnion ball valve is closed and the ball is fixed in orientation.

7. The trunnion ball valve of claim 6, wherein the at least one pressurization valve is/are configured to be automatically transitioned to the depressurizing state before the ball is rotated, and to the pressurizing state after the trunnion ball valve is closed and the ball is fixed in orientation.

8. The trunnion ball valve of claim 6, further comprising an electronic valve controller that is configured to place the at least one pressurization valve in the depressurizing state when the ball and the valve stem are being rotated, and to place the at least one pressurizing valve in the pressurizing state when the trunnion ball valve is closed and the ball is fixed in orientation.

9. The trunnion ball valve of claim 8, wherein the electronic controller is configured to control rotation of the valve stem as well as reconfiguration of the at least one pressurization valve.

10. The trunnion ball valve of claim 1 wherein the ball is fixed in lateral position at an upper end thereof to the top of the housing via an upper trunnion.

* * * * *